US012755961B2

(12) United States Patent
Khokhlov et al.

(10) Patent No.: US 12,755,961 B2
(45) Date of Patent: Oct. 6, 2026

(54) ALKALINE BATTERY ASSEMBLED IN A DISCHARGED STATE AND A METHOD OF PRODUCING BATTERY ELECTRODE MATERIALS

(71) Applicant: Zelos Energy Ltd., San Leandro, CA (US)

(72) Inventors: Pavel Khokhlov, San Ramon, CA (US); Alexander Gorer, Brisbane, CA (US)

(73) Assignee: Zelos Energy Ltd., San Leandro, CA (US)

( * ) Notice: Subject to any disclaimer, the term of this patent is extended or adjusted under 35 U.S.C. 154(b) by 726 days.

(21) Appl. No.: 17/350,717

(22) Filed: Jun. 17, 2021

(65) Prior Publication Data

US 2021/0399283 A1 Dec. 23, 2021

Related U.S. Application Data

(60) Provisional application No. 63/040,174, filed on Jun. 17, 2020.

(51) Int. Cl.

| | |
|---|---|
| ***H01M 4/28*** | (2006.01) |
| ***H01M 4/24*** | (2006.01) |
| ***H01M 4/50*** | (2010.01) |
| ***H01M 4/62*** | (2006.01) |
| ***H01M 10/28*** | (2006.01) |

(52) U.S. Cl.

CPC ............. *H01M 4/28* (2013.01); *H01M 4/244* (2013.01); *H01M 4/50* (2013.01); *H01M 4/625* (2013.01); *H01M 10/28* (2013.01); *H01M 2300/0014* (2013.01)

(58) Field of Classification Search

CPC ................................ H01M 4/244; H01M 4/50

See application file for complete search history.

(56) References Cited

U.S. PATENT DOCUMENTS

| | | | |
|---|---|---|---|
| 4,888,098 | A | 12/1989 | Nyberg et al. |
| 5,635,041 | A | 6/1997 | Bahar et al. |
| 6,638,659 | B1 | 10/2003 | Fenton et al. |
| 8,597,379 | B2 | 12/2013 | Mckinney et al. |
| 10,044,016 | B2 | 8/2018 | Kakeya et al. |
| 10,147,974 | B2 | 12/2018 | Masel et al. |
| 10,910,674 | B2 | 2/2021 | Wei et al. |

(Continued)

FOREIGN PATENT DOCUMENTS

| | | | |
|---|---|---|---|
| WO | 2002075830 | A1 | 9/2002 |
| WO | 2011100602 | A1 | 8/2011 |

(Continued)

OTHER PUBLICATIONS

Fukuta, K. (May 8, 2011). Electrolyte materials for AMFCs and AMFC performance [Workshop presentation]. Tokuyama Corporation, AMFC Workshop.

(Continued)

*Primary Examiner* — Stephan J Essex
(74) *Attorney, Agent, or Firm* — Polygon IP, LLP

(57) ABSTRACT

In one embodiment, a battery cell can include a cathode including at least one of MnO or Mn(OH)2. The battery can also include an anode including at least one of ZnO or Zn(OH)2 and an electrolyte. The battery cell can be a rechargeable battery cell with total capacity before first charge or discharge of less than 30% of total capacity of this battery in a fully charged state.

13 Claims, 6 Drawing Sheets

(56) References Cited

U.S. PATENT DOCUMENTS

| | | | |
|---|---|---|---|
| RE50,276 | E | 1/2025 | Zhang |
| 12,355,061 | B2 | 7/2025 | Yadav |
| 2005/0026038 | A1 | 2/2005 | Hall et al. |
| 2007/0009771 | A1 | 1/2007 | Leddy et al. |
| 2009/0246623 | A1 | 10/2009 | Phillips et al. |
| 2011/0027666 | A1 | 2/2011 | Burchardt et al. |
| 2012/0321970 | A1 | 12/2012 | Friesen et al. |
| 2015/0155559 | A1 | 6/2015 | Zimmerman et al. |
| 2017/0012313 | A1 | 1/2017 | Inoue et al. |
| 2018/0017535 | A1 | 1/2018 | Cooks et al. |
| 2018/0175354 | A1 | 6/2018 | Tokushima et al. |
| 2019/0044129 | A1 | 2/2019 | Yadav et al. |
| 2020/0083505 | A1 | 3/2020 | Kaye et al. |
| 2020/0176820 | A1 | 6/2020 | Fujita |
| 2021/0104746 | A1 | 4/2021 | Farmer et al. |
| 2021/0336266 | A1 | 10/2021 | Khokhlov et al. |
| 2021/0351458 | A1 | 11/2021 | Khokhlov et al. |
| 2021/0367293 | A1 | 11/2021 | Khokhlov et al. |
| 2021/0399283 | A1 | 12/2021 | Khokhlov et al. |
| 2022/0285695 | A1 | 9/2022 | Khokhlov et al. |
| 2022/0399588 | A1 | 12/2022 | Khokhlov et al. |
| 2024/0113280 | A1 | 4/2024 | Gorer et al. |

FOREIGN PATENT DOCUMENTS

| | | |
|---|---|---|
| WO | 2019/028160 | 2/2019 |
| WO | 2019/133822 | 7/2019 |
| WO | 2021/133898 | 7/2021 |

OTHER PUBLICATIONS

Li, M. et al. (2025). Full depth-of-discharge cycling in Zn|$MnO_2$ batteries enabled by alkaline salt-concentrated hydrogel electrolyte. Advanced Functional Materials, 2508361. https://doi.org/10.1002/adfm.202508361.

Ning, T. et al. (2023). Self-crosslinked alkaline polyelectrolyte membranes with exceptional stability under dry-wet alternating conditions. Journal of Membrane Science, 685, 121900. https://doi.org/10.1016/j.memsci.2023.121900.

Stock, D. et al. (2018). Towards zinc-oxygen batteries with enhanced cycling stability: The benefit of anion-exchange ionomer for zinc sponge anodes. Journal of Power Sources, 395, 195-204. https://doi.org/10.1016/j. jpowsour.2018.05.079.

Turney, D. E. et al. (2017). Rechargeable zinc alkaline anodes for long-cycle energy storage. Chemistry of Materials. Advance online publication. https://doi.org/10.1021/acs.chemmater.7b00853.

Wang, N. et al. (2021). A review of zinc-based battery from alkaline to acid. Materials Today Advances, 11, 100149. https://doi.org/10.1016/j.mtadv.2021.100149.

Wang, Y. et al. (2023). Status and opportunities of zinc ion hybrid capacitors: Focus on carbon materials, current collectors, and separators. Nano-Micro Letters, 15, 78. https://doi.org/10.1007/s40820-023-01065-x.

Yadav, G. et al. (2017). Regenerable Cu-intercalated $MnO_2$ layered cathode for highly cyclable energy dense batteries. Nature Communications, 8, 14424. https://doi.org/10.1038/ncomms14424.

Yadav, G. et al. (2019). Breaking the 2V barrier in aqueous zinc chemistry: Creating 2.45V and 2.8V $MnO_2$—Zn aqueous batteries. ACS Energy Letters. https://doi.org/10.1021/acsenergylett.9b01643.

Yadav, G. et al. (2024). Rechargeable zinc-manganese dioxide batteries. In Encyclopedia of electrochemical power sources (2nd ed.). Elsevier. https://doi.org/10.1016/B978-0-323-96022-9.00103-1.

Zhong, C. et al. (2020). Decoupling electrolytes towards stable and high-energy rechargeable aqueous zinc-manganese dioxide batteries. Nature Energy, 5, 440-449. https://doi.org/10.1038/s41560-020-0584-y.

ALKALINE BATTERY ASSEMBLED IN A DISCHARGED STATE AND A METHOD OF PRODUCING BATTERY ELECTRODE MATERIALS

CROSS-REFERENCE TO RELATED PATENT APPLICATION

The present disclosure is part of a non-provisional patent application claiming the priority benefit of U.S. Patent Application No. 63/040,174, filed on Jun. 17, 2020, which is incorporated by reference in its entirety.

TECHNICAL FIELD

The present disclosure relates generally to the field of batteries and components for batteries. More specifically, the present application relates to batteries or cells that are assembled in a discharged state and include an ion exchange material.

BACKGROUND

Manganese dioxide based electrodes have been used extensively in primary, single-use battery cells and particularly in dry and alkaline manganese dioxide zinc cells. Manganese dioxide has also been employed in various rechargeable batteries, including non-aqueous electrolyte cells having an alkali light metal such as lithium as an active material.

Industrial processes to manufacture battery grade manganese dioxide are well developed and generally efficient. Battery grade manganese dioxide has been derived from both naturally occurring manganese dioxide and synthetically produced manganese dioxide. Synthetic dioxide is generally divided into two categories: electrolytic manganese dioxide (EMD) and chemical manganese dioxide (CMD). Because of its high impurity content, naturally occurring manganese dioxide is not generally employed in alkaline or lithium cells. EMD, which is typically manufactured from direct electrolysis of a bath of manganese sulfate and sulfuric acid, is typically a high purity, high density, gamma-manganese dioxide that has been proven to be desirable for use as cathode active material in alkaline and lithium cells. During the electrolysis process, the gamma-EMD is deposited directly on the anode which is typically made of titanium, a lead alloy, or carbon. The EMD deposit is removed from the anode, crushed, ground, washed, neutralized and dried prior to use as an active material in a battery.

EMD has been a preferred material for use as the cathodic reactant in batteries primarily because of the ability of EMD to provide batteries having significantly improved discharge capacity compared to batteries produced from naturally occurring or chemically produced manganese dioxides. It is generally believed that the improved performance of EMD depends to a large extent on the operating conditions employed during the electrolysis process used to manufacture this material. Accordingly, attempts to improve the performance of batteries containing an electrode comprised of EMD have focused on manufacturing techniques that provide highly pure EMD.

Unfortunately, electroplating electrolytic manganese dioxide is an expensive and energy intensive project. Additionally, some desired compositions and additives are difficult or impossible to co-electroplate with EMD. Inexpensive and more flexible alternatives to conventional EMD processing are needed.

In conventional alkaline battery system, the anode is usually a Zn-metal electrode. Zn metal is produced from ore converted first to ZnO. The ZnO is then reduced to Zn metal using a blast furnace to melt the prepared ore into its elemental components. The blast furnace is fueled by electricity, coke, or natural gas, which generate temperatures of up to 2200° F. (1204° C.). This, however, also generates carbon dioxide, which recombines with the zinc as it cools to re-form zinc oxide. To reduce this reformation, the zinc is sprayed with molten lead while it is still hot. The lead, at 1022° F. (550° C.), dissolves the zinc and carries it to another chamber, where it is cooled to 824° F. (440° C.). At this temperature, the lighter zinc separates out of the lead and is drained off the top. The lead is reheated and returned to the blast furnace.

Another process for Zn metal manufacturing is by electrolysis. ZnO is dissolved to form $ZnSO_4$ in the process called leaching. The process is followed by purification and electrolysis that results in formation of Zn metal. One metric ton of zinc production expends about 3,900 kWh of electric power.

The processes of ZnO reduction are very energy intensive. Using ZnO as an active material for battery electrodes significantly reduces number of manufacturing steps resulting to lower material cost and reducing cost of the stored energy by the final battery with the ZnO electrodes.

SUMMARY

In one embodiment, a battery cell assembled in a discharged state can include a cathode including at least one of MnO or $Mn(OH)_2$. The battery can also include an anode including at least one of ZnO or $Zn(OH)_2$ and an electrolyte.

In some embodiments the battery cell is a rechargeable battery cell with total capacity before first charge or discharge of less than 30% of total capacity of this battery in a fully charged state.

In some embodiments the electrolyte is an alkaline electrolyte.

In some embodiments the battery cell includes an ion exchange material contacting at least one of the cathode, anode, and electrolyte.

In some embodiments, a method for producing battery electrode material includes providing a dispersed conductive additive and chemically depositing an active electrode material from liquid phase onto the dispersed conductive additive.

In some embodiments the additive is co-precipitated along with the active electrode material during the precipitation step.

In some embodiments the active material is MnO or $Mn(OH)_2$.

In some embodiments the active material is ZnO or $Zn(OH)_2$

In some embodiments inorganic compounds additives comprising at least one of the elements of Bi, Cu, Zn, Sr, Ba, Ca, Fe, Y, Cr, Co, Ni, V, Ti, Mn, Mg, Al, In, Sn, W.

In some embodiments the battery cell can include a conductive additive to the battery cell that is a carbonaceous material comprising graphite, carbon black, acetylene black, carbon fibers, carbon nanotubes, graphene, or other carbon nanomaterials.

In some embodiments a separation step can be done by filtration, sedimentation or centrifugation.

In some embodiments a purification step that can be done by washing or/and chemical treatment or thermal treatment.

In some embodiments a mechanical treatment step can be used.

In one embodiment battery cell includes a cathode including at least one of MnO or $Mn(OH)_2$ derived from chemical precipitation from liquid phase. An anode including at least one of ZnO or $Zn(OH)_2$ derived from chemical precipitation from liquid phase can also be used in the battery cell.

In some embodiments the cathode is chemically deposited on dispersed graphite in liquid.

In one embodiment a battery cell includes a cathode including at least one of MnO or $Mn(OH)_2$ and dopant additives derived at least in part from electrolytic deposition. An anode including at least one of ZnO or $Zn(OH)_2$ and an electrolyte can be used in the battery cell.

In one embodiment a battery electrode material includes an active material including at least one of MnO or $Mn(OH)_2$ or their mixed phases with at least one of the elements of Bi, Cu, Zn, Sr, Ba, Ca, Fe, Y, Cr, Co, Ni, V, Ti, Mn, Mg, Al, In, Sn, W; and a conductive additive.

In one embodiments the conductive additive is a carbonaceous material comprising graphite, carbon black, acetylene black, carbon fibers, carbon nanotubes, graphene, or other carbon nanomaterials In one embodiment a battery electrode material includes a ZnO active material that includes substantially no Zn metal and constitutes more than 90% by weight of the electrode material.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

In one embodiment, low cost battery systems can include $MnO_2$ and Zn electrode material that is prepared and assembled in a discharged state. Conventional primary alkaline batteries typically use $MnO_2$ and Zn as active electrode materials, with the battery assembled in a charged state. Using these materials discharged forms (MnO and ZnO) rather than conventional $MnO_2$ and Zn metal reduces raw material costs, since both elements naturally exist in discharged forms ($Mn^{2+}$ and $Zn^{2+}$). In addition, converting the elements to charged forms (Mn4+ and ZnO) requires significant energy resources (e.g. annealing ZnO at 2000° F. and electro-oxidation at high current of $Mn^{2+}$ to $MnO_2$). Cell assembled in a discharge state undergoes first formation charge that can be optimized to improve long term stability of the system.

Both ZnO and MnO can be prepared by wet chemistry techniques, allowing in materials design flexibility by changing composition and doping during co-precipitation with different additive elements. This allows tuning elemental composition of the active oxides, improving system stability, discharge potentials and rate capability. Electrode conductivity and system stability can be improved by varying MnO synthesis conditions (temperature, pH) and composition (co-precipitation with additive elements).

Figure 1:
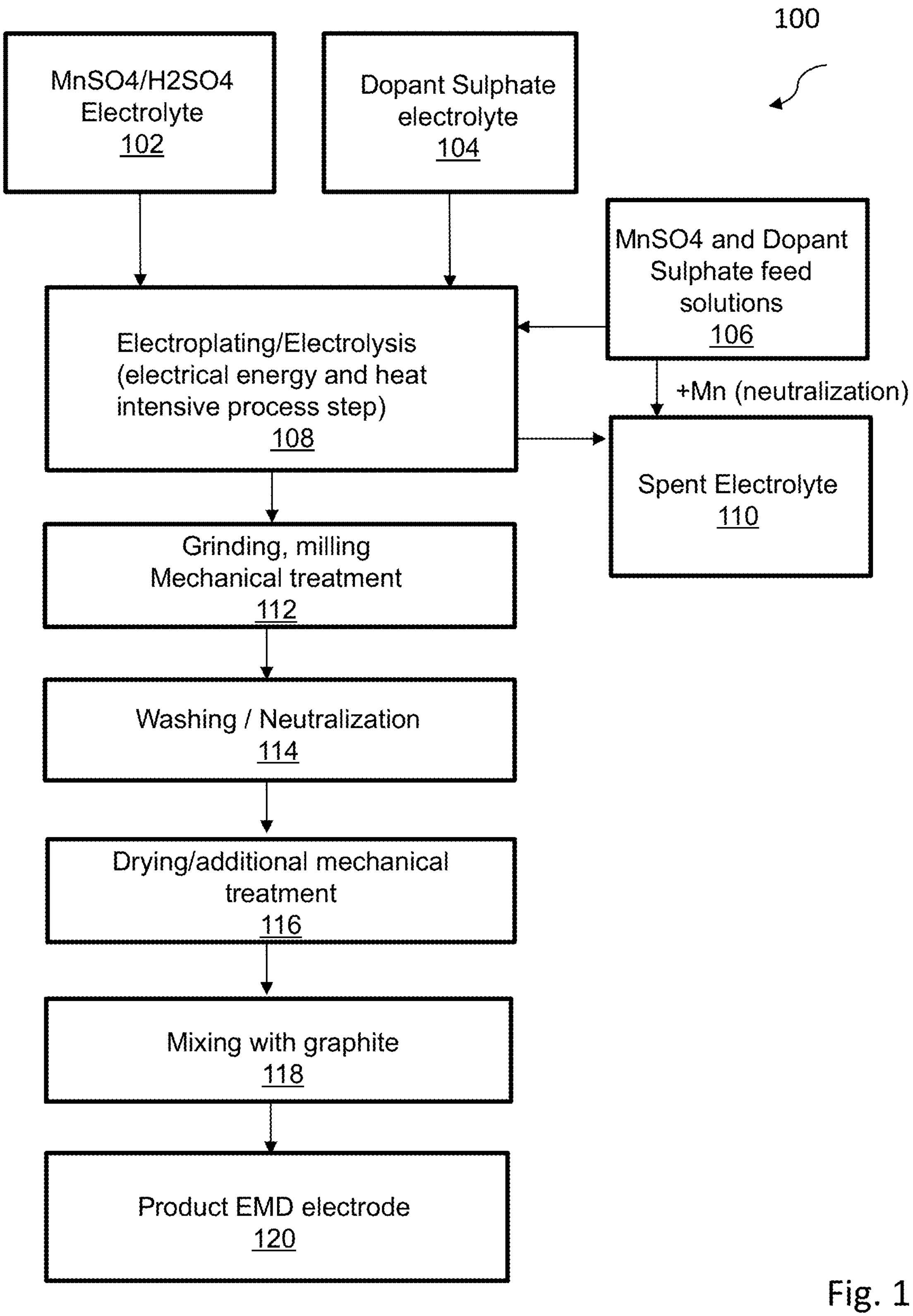
FIG. 1 shows a schematic representation of a method for doped EMD production.

FIG. 1 illustrates a process 100 for doped EMD production that includes preparing manganese sulfate from manganese dioxide ore with reduction roasting of the manganese dioxide ore in the presence of coal (carbon) to produce a suitable acid soluble Mn(II) species; i.e. $MnO^{2+}C{=}MnO+CO$. This is typically carried out at a temperature of about 950 degrees C. The reduced ore is then dissolved in sulfuric acid according to the reaction: $MnO+H_2SO_4=MnSO_4+H_2O$ and readied for processing (steps 102 and 106)

Initial purification occurs as a result of pH changes in the leach solution. Insoluble sulfates, such as $BaSO_4$, are removed almost immediately. With the dissolution of more MnO, and hence consumption of $H_2SO_4$, the pH increases to about 1.9, at which point precipitation of potassium jarosite occurs; i.e.

$$K_2SO_4+3Fe_2(SO_4)_3+12H_2O=2KFe_3(SO^{-4})2(OH)^{6+}6H_2SO_4$$

This removes K+ and $Fe^{3+}$ from the leach solution. Additional MnO is added to the leach solution until a final pH of about 4.5 is reached. During this neutralization stage further purification occurs resulting in the precipitation of a number of trace elements. $Al_2O_3$ and $SiO_2$ precipitate during this stage, as does goethite (FeOOH), which has the added feature of adsorbing metal ions of Mo, Sb and As. Further purification can be achieved through the addition of NaSH. This results in the precipitation of all non-manganese transition metal ions.

In one embodiment, before or during electrolysis, a minor amount of a dopant is deliberately added to modify the product deposited on the anode during electrolysis (step 104). The dopant is introduced into the solution subjected to electrolysis in the form of a compound which disassociates in the solution to form an ion.

In order to produce material for a positive electrode, electrolysis starts as step 108. Electrolysis is very energy and time-consuming process which requires additional equipment, substantial energy resources and additional health and environmental safety restrictions.

Electrolysis of the purified $MnSO_4$ solution leads to EMD formation. The electrolysis reactions can be described by:

$$\text{Anode: } Mn^{2+}+2H_2O{=}MnO_2(\text{plating})+4H{+}+2e{-} \quad (5)$$

$$\text{Cathode: } 2H{+}+2e{-}=H_2 \quad (6)$$

Overall:

$$Mn^{2+}+2H_2O{=}MnO_2(\text{plated})+H2+2H{+} \quad (7)$$

Spent electrolyte and/or +Mn neutralized $MnSO_4$ feed solutions can be removed as step 110.

Typical anode materials include titanium, carbon or lead, while typical cathode materials include carbon, copper or lead. Electrolysis is well known to be a key stage in producing battery grade material. Purity of the feed electrolyte ensures the chemical purity of the EMD product, while controlled anodic current density, temperature, Mn2+ and $H_2SO_4$ electrolyte concentration determine the EMD structure best suited to provide the best compromise between electrochemical and physical properties of the end product. Typical electrolysis conditions are an anodic current density between 55 and 75 A $m^{-2}$, temperatures in excess of 95 C, and $Mn^{2+}/H_2SO_4$ mole ratios of about 2. The final stages in production involves collecting the deposited EMD and grinding it to the appropriate particle size (step 112). Following this the EMD powder undergoes water washing and neutralization to remove residual electrolyte and drying (step 114) and further drying or mechanical treatment (step 116). The material is mixed with graphite (step 118) and used as an electrode in a battery (step 120).

Figure 2:
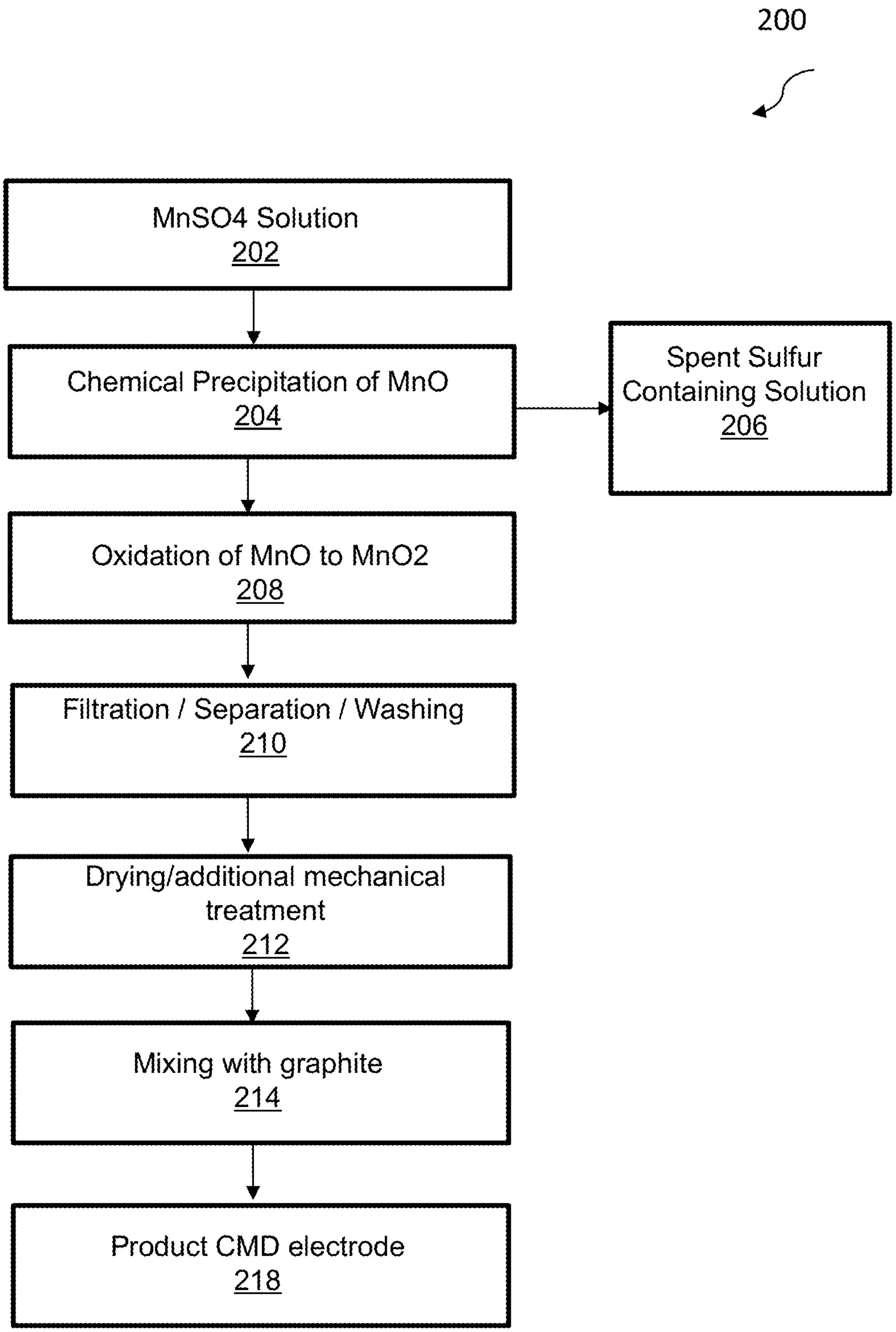
FIG. 2 shows a schematic representation of a batch method for CMD production.

FIG. 2 illustrates a process 200 for batch CMD production that includes preparation of materials suitable for use in battery cathodes using wet chemistry methods, i.e., chemically produced doped manganese oxides.

Process steps include providing a $MnSO_4$ solution (step 202) and chemically precipitating MnO (step 204). Spent sulfur containing solution is removed (step 206) and MnO is oxidized to $MnO_2$. Following this the CMD powder undergoes filtration, separation and washing (step 210) to remove residual electrolyte and drying or mechanical treatment (step 212). The material can be mixed with graphite (step 214) and used as a CMD derived electrode in a battery (step 218).

Figure 3:
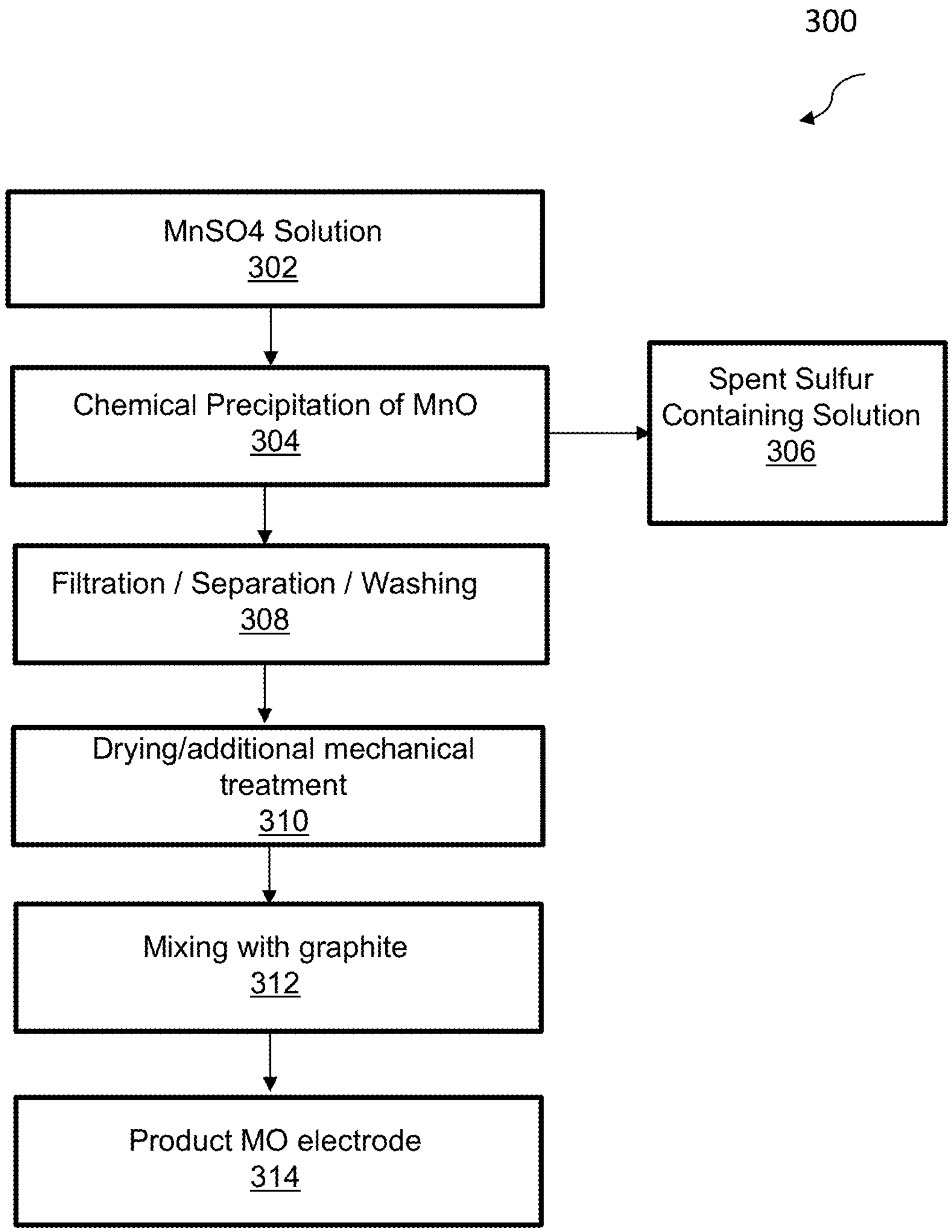
FIG. 3 shows a schematic representation of a batch method for MnO (MO) production.

FIG. 3 illustrates a process 300 for batch Manganese Oxide (MO) production that includes preparation of materials suitable for use in battery cathodes using wet chemistry methods. In this embodiment manganese oxide has final product oxidation state +2 representing a discharged state of the electrode.

Process steps include providing a $MnSO_4$ solution (step 302) and chemically precipitating MnO (step 304). Spent sulfur containing solution is removed (step 306). Following this the MO powder undergoes filtration, separation and washing (step 308) to remove residual dissolved by-products and drying or mechanical treatment (step 310). The material can be mixed with graphite (step 312) and used as a MO derived electrode in a battery (step 314).

Figure 4:
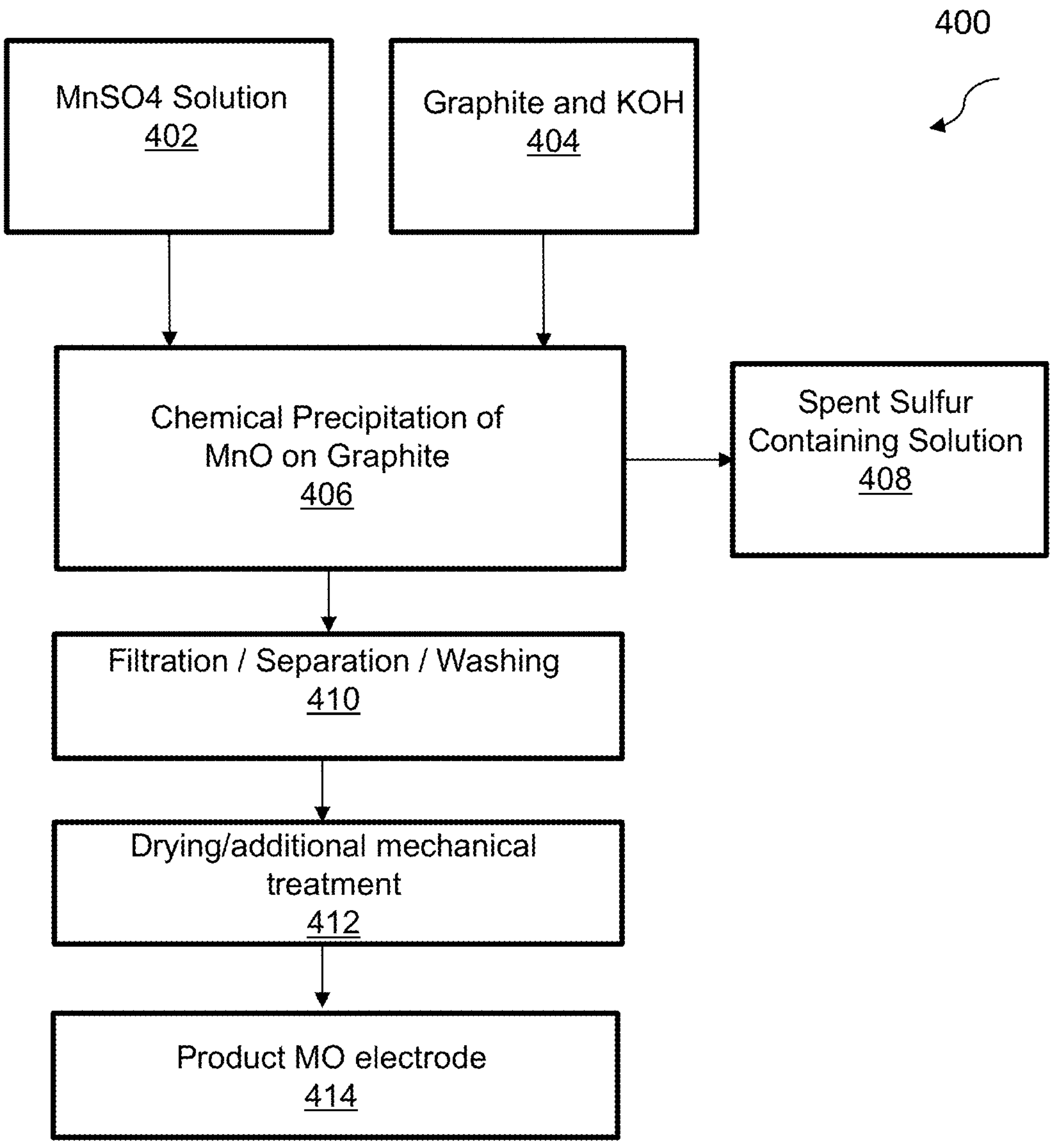
FIG. 4 shows an embodiment of the battery material manufacturing process.

FIG. 4 illustrates a process 400 for batch Manganese Oxide (MO) production where MO is precipitated on dispersed graphite in liquid that includes preparation of materials suitable for use in battery cathodes using wet chemistry methods. In this embodiment manganese oxide has final product oxidation state 2+ representing a discharged state of the electrode.

Process steps include providing a $MnSO_4$ solution (step 402) and graphite dispersion in KOH solution (step 404) and chemically precipitating MnO on graphite (step 406). Spent sulfur containing solution is removed (step 308). Following this the MO powder undergoes filtration, separation and washing (step 410) to remove residual dissolved by-products and drying or mechanical treatment (step 412). The material can be used as a MO derived electrode in a battery (step 414).

Figure 5:
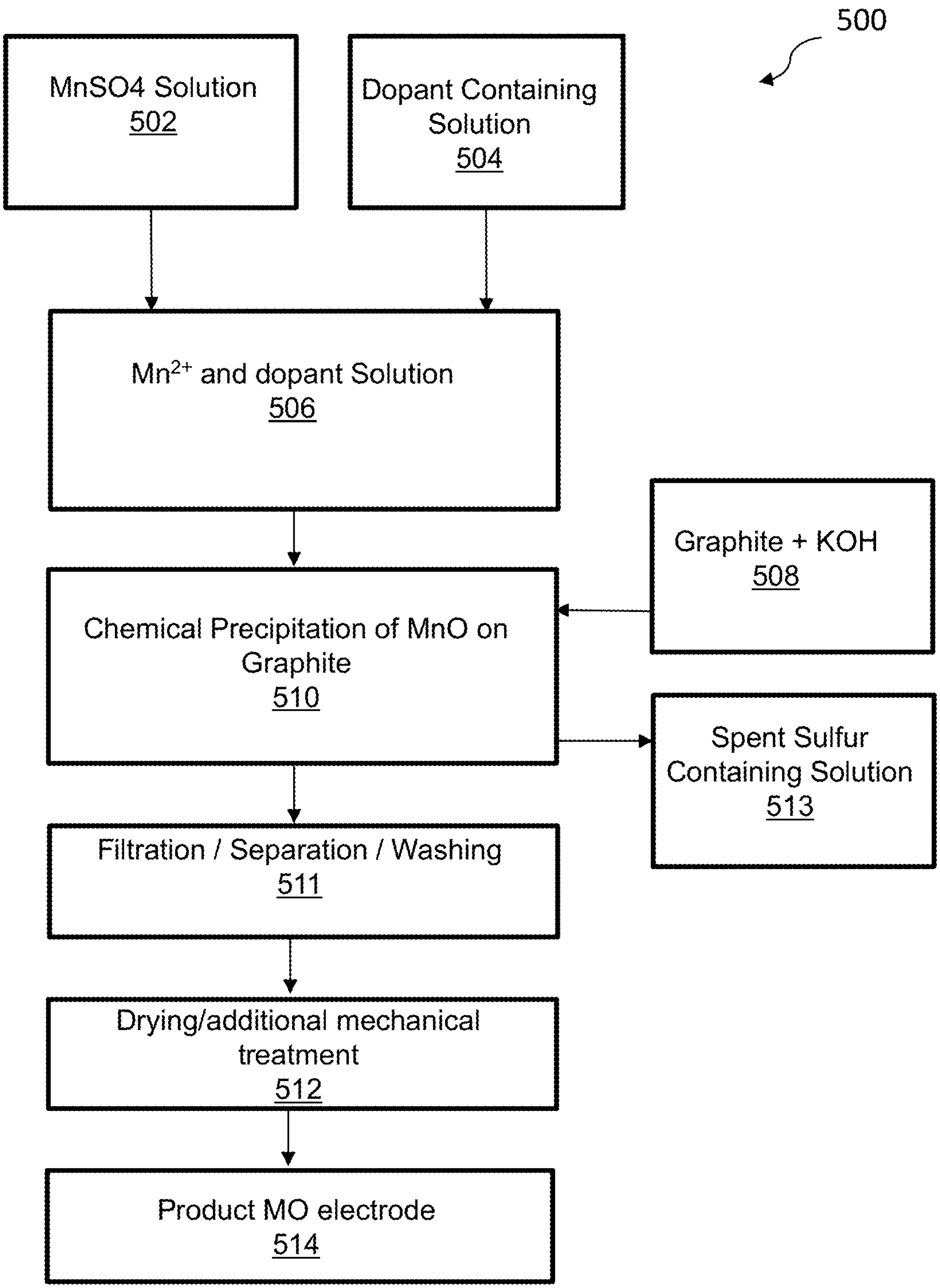
FIG. 5 shows another embodiment of the battery material manufacturing process.

FIG. 5 illustrates a process 500 for batch doped Manganese Oxide (MO) production where MO is precipitated on dispersed graphite in a liquid that includes preparation of materials suitable for use in battery cathodes using wet chemistry methods. In this embodiment manganese oxide has final product oxidation state 2+ representing a discharged state of the electrode.

Process steps include providing a $MnSO_4$ solution (step 502) and a one or more dopant containing solutions (step 504). These are mixed in step 506 to provide $Mn^{2+}$ and dopant solution. This solution is mixed with graphite dispersed in KOH solution (step 508) to chemically precipitate MnO on graphite (step 510). Spent sulfur containing solution is removed (step 513). Following this the MO powder undergoes filtration, separation and washing (step 511) to remove residual dissolved by-products. Following this the MO powder undergoes drying or mechanical treatment (step 512). The anode electrode material can be used as a MO derived electrode in a battery (step 514).

Example 1

The example describes preparation of a ZnO-based battery anode material co-precipitated with $Bi_2O_3$ on graphite conductive additive.

2 g of $Bi(NO_3)_3 \cdot 5H_2O$ were dissolved in 24.6 g of aqueous 10% $HNO_3$ and added to the solution of 35 g of $ZnSO_4 \cdot 7H_2O$ in 62.4 g of water forming mixture A. 0.53 g of graphite (FormulaBT, Superior Graphite) was dispersed in a solution of 20 g KOH in 40.6 g of water forming mixture B. Mixture B was added slowly to the mixture A while stirring on magnetic stirrer. Grey precipitate was formed. The precipitate was washed with large amount of water by sedimentation/redispergation and separated from liquid using vacuum filtration on paper filter. The filter cake was dried in air oven at 120° C. for 2 hours.

Example 2

The example describes preparation of MnO-based battery cathode material co-precipitated with $Bi2O_3$ on graphite conductive additive.

4.1 g of $Bi(NO_3)_3 \cdot 5H_2O$ were dissolved in 50.4 g of aqueous 10% $HNO_3$ and added to the solution of 20 g of $Mn(NO_3)_2$ hydrate in 19.9 g of water forming mixture A. 2.6 g of graphite (FormulaBT, Superior Graphite) was dispersed in a solution of 29.2 g KOH in 70.7 g of water forming mixture B. Mixture B was added slowly to the mixture A while stirring on magnetic stirrer. Precipitate was formed. The mixture was left for sedimentation and the precipitate was washed with large amount of water by sedimentation/redispergation and separated from liquid using vacuum filtration on paper filter. The filter cake was dried in vacuum at 95° C. for 12 hours.

Example 3

The example describes preparation of MnO-based battery cathode material co-precipitated with $Bi_2O_3$ and copper oxide on graphite conductive additive.

4.2 g of $Bi(NO_3)_3 \cdot 5H_2O$ were dissolved in 50.1 g of aqueous 10% $HNO_3$ forming solution 1; 20 g of $Mn(NO_3)_2$ hydrate was dissolved in 20 g of water forming solution 2; 4.15 g of $CuSO_4 \cdot 5H_2O$ was dissolved in 16.1 g of water forming solution 3. Solutions 1, 2 and 3 were combined on a magnetic stirrer forming mixture A. 2.8 g of graphite (FormulaBT, Superior Graphite) was dispersed in a solution of 30.1 g KOH in 71.8 g of water forming mixture B. Mixture B was added slowly to the mixture A while stirring on magnetic stirrer. Precipitate was formed. The mixture was left for sedimentation and the precipitate was washed with large amount of water by sedimentation/redispergation and separated from liquid using vacuum filtration on paper filter. The filter cake was dried in vacuum at 95° C. for 12 hours.

Figure 6:
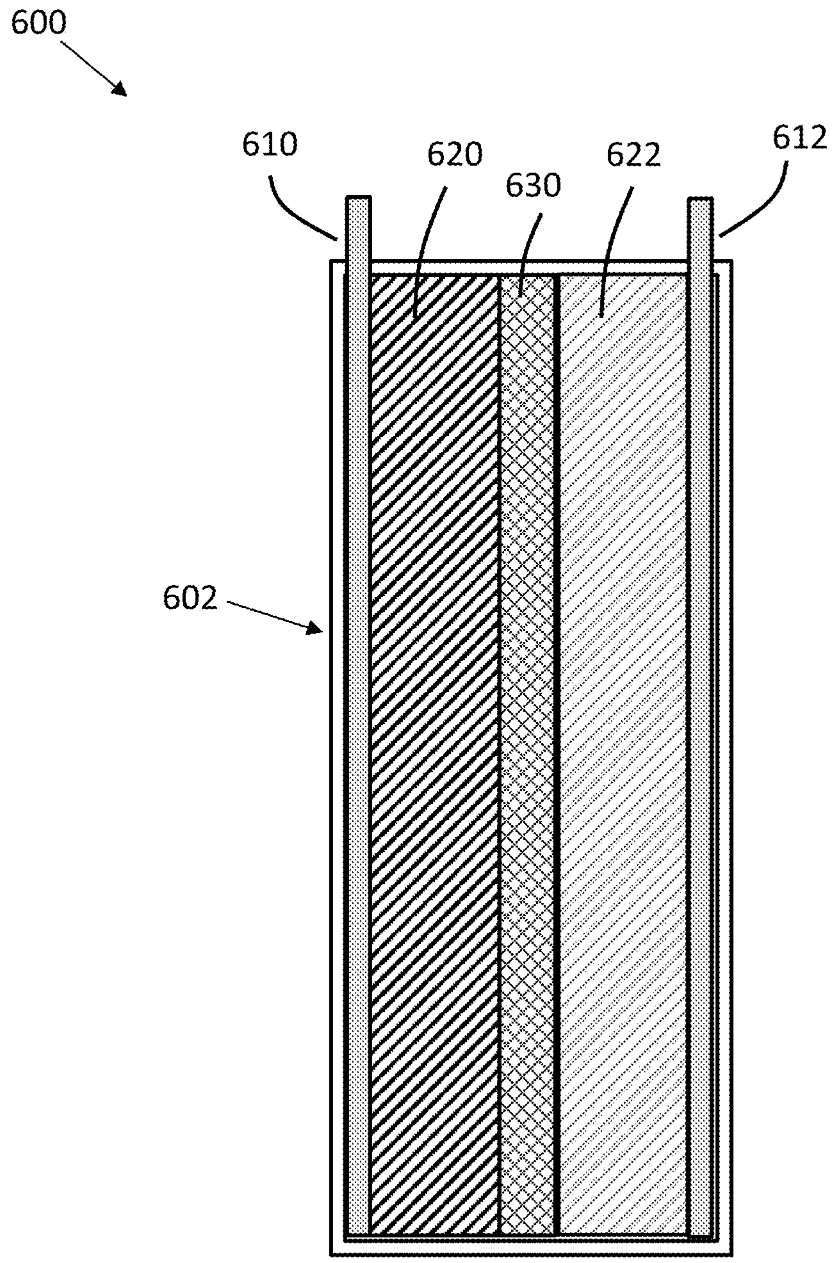
FIG. 6 shows a representative battery formed from materials as created by at least one of the described processes herein.

The present disclosure also relates in part to battery cells manufactured using materials formed using at least one of the foregoing described processes for manufacture of doped or undoped EMD, CMD, or MO. For example, FIG. 6 illustrates a rechargeable battery cell system 600 that includes a casing 602 that surrounds various battery components. Battery components can include current collectors 610 and 612 that facilitate charge and discharge of the battery cell system 100. Other components include electrode material 620 and 622 formed at least in part using described processes form manufacture of doped or undoped EMD, CMD, or MO that respectively contact current collectors 610 and 612. The electrode material 620 and 622 are separated from each other by a separator 630 that only permits ion flow between the material. The rechargeable battery cell system 600 can include anode, cathode, ion exchange materials, and other materials and components as described in the following:

Electrodes

Electrode material can include material formed as thin films, or structured patterns such as columns, needles, groove, or slots. In some embodiments electrodes can be loosely arranged materials, rigidly bound or sintered structures, or solid continuous pore structures. In one embodiment, electrodes can be formed from particles provided in various forms such as powders, granules, pellets, or nanomaterial. In certain embodiments, particles can have an average size (diameter or longest dimension) of between about 0.1 μm to 300 μm, and in a specific embodiment, between about 100 μm and 1 μm. In some embodiments, relatively homogeneous particle sizes can be used, while in other embodiments heterogenous sized materials can be used. Particles can be processed to increase effective surface area. In some embodiments, particles can be processed by heating, melting, fusing, or sintering to bind together the particles. In other embodiments, additional binders can be used to hold particles together. In some embodiments, air or other gas based electrodes can include structures for admitting air and providing active sites for chemical reactions.

Collectors

At least a portion of electrode material is placed in contact with a current collector. The current collector serves to supply an electric current so that it can be consumed for the electrode reaction during charge and collect an electric current generated during discharge. The current collector is typically formed from a material which has a high electrical conductivity and is inactive to electrochemical battery cell reaction. The current collector may be shaped in a plate form, foil form, mesh form, porous sponge-like form, punched or slotted metal form, or expanded metal form.

The material of the current collector can include Ni, Ti, Cu, Al, Pt, V, Au, Zn, and alloys of two or more of these metals such as stainless steel, bronze, or brass. Other embodiments can include graphite cloth, graphite foil, copper sheet or mesh slotted or woven brass.

Anode Material

Anode materials for an electrode can include a zinc oxide (ZnO), zinc hydroxide ($Zn(OH)_2$), iron oxides (FeOx), iron hydroxides ($Fe(OH)_x$), or salts of iron or zinc.

More broadly, anode materials can include:

Any metal M, metal oxide MOx or metal salt having a redox potential E0 lower than the redox potential of the cathode material.

Any metal oxide MOx having a redox potential E0 lower than the redox potential of the cathode material.

Any alloy of any metals MM1M2 . . . Mn, mixed oxides or mixed salts having a E0 lower than the E0 of the cathode material.

Any polymer that can accommodate ions in its structure having a redox potential E0 lower than the redox potential of the cathode material.

Any mixture of one or more of the above mentioned type of materials.

Cathode Material

Cathode material for an electrode can include manganese oxide (MnO), manganese hydroxide ($Mn(OH)_2$), manganese oxy-hydroxide (MnOOH), nickel hydroxide ($Ni(OH)_2$), copper oxide (CuO) or copper hydroxide (Cu(OH)2), silver oxides ($Ag_2O$, AgO) or any combinations. In some embodiments, the cathode may be gas breathing electrode.

More broadly, cathode materials may include:

Any metal M, metal oxide MOx or metal salt having a redox potential E0 larger than the redox potential of the anode material.

Any metal oxide MOx having a redox potential E0 larger than the redox potential of the anode material.

Any alloy of any metals MM1M2 . . . Mn having a E0 larger than the E0 of the anode material.

Any metal fluoride MFn having a redox potential larger than the anode material.

Any alloy MM1M2 . . . MnOxFm with n larger or equal to 2 and m being larger or equal to zero.

Any polymer that can accommodate ions in its structure having a redox potential E0 larger than the redox potential of the anode material.

Any mixture of one or more of the above mentioned type of materials.

Additives and Binding Agents

Various additives can be used to improve electrochemical, electrical, or mechanical features of the electrodes. For example, electrochemical performance can be improved by addition of nickel, nickel hydroxide, nickel oxyhydroxide, or nickel oxide containing cathode material that can incorporate or be coated with small amounts of cobalt oxide, strontium hydroxide ($Sr(OH)_2$), barium oxide (BaO), calcium hydroxide ($Ca(OH)_2$), $Fe_3O_4$, calcium fluoride ($CaF_2$), or yttrium oxide ($Y_2O_3$) to improve battery cell performance. As another example, electrode can includes an oxide such as bismuth oxide, indium oxide, and/or aluminum oxide. Bismuth oxide and indium oxide may interact with zinc and reduce gassing at the electrode. Bismuth oxide may be provided in a concentration of between about 1 and 10% by weight of a dry negative electrode formulation. Indium oxide may be present in a concentration of between about 0.05 and 1% by weight of a dry negative electrode formulation. Aluminum oxide may be provided in a concentration of between about 1 and 5% by weight of a dry negative electrode formulation.

In certain embodiments, one or more additives may be included to improve corrosion resistance of the zinc electrode material. Specific examples of anions that may be included to reduce the solubility of zinc in the electrolyte include phosphate, fluoride, borate, zincate, silicate, or stearate. Generally, these anions may be present in an electrode in concentrations of up to about 10% by weight of a dry electrode formulation.

Additives that improve electrical characteristics such as conductivity can also be added. For example, a range of carbonaceous materials can be used as electrode additives, including powdery or fibrous carbons such as graphite, coke, ketjen black, and acetylene black. Carbonaceous nanomaterials can also be used such as single or multiwalled carbon nanotubes, carbon nanofibers, multi-layered carbon nanoparticles, carbon nanowhiskers, graphene or carbon nanorods.

Additives may be provided as chemically homogeneous components into a mixture or solution, co-precipitated, or coated onto particles Mechanical properties can be improved in one embodiment by addition of binding agents to provide increased electrode mechanical strength, and flexure or crack reduction for the electrode. Binding agents may include, for example, polymeric materials such as polytetrafluoroethylene (PTFE), polyethylene (PE), polypropylene (PP), polyisobutylene (PIB), polyvinyl alcohol (PVA), polyacrylic acid, polyvinyl acetate, carboxy methyl cellulose (CMC), styrene butadiene rubber (SBR), polyethylene oxide (PEO), polybutylene terephthalate (PBT) or polyamides, polyvinylidene fluoride (PVDF), silicone-based elastomers such as polydimethyl siloxane (PDMS) or rubber materials such as natural rubber (NR), ethylene propylene rubber (EPM) or ethylene propylene diene monomer rubber (EPDM).

Ion Exchange Material

In some embodiments an ion exchange material can be used to improve performance. The ion exchange material is generally selective for the transport of either cations or anions. An anion selective ion exchange material can be used alone, a cation selective ion exchange material can be used alone, or they can be used in combination with each other. In one embodiment the ion exchange material can be an organic or polymeric material having attached strongly acidic groups, such as sulfonic acid including, sodium polystyrene sulfonate, or polyAMPS. Alternatively, the ion exchange material can be an organic or polymeric material having attached strongly basic groups, such as quaternary amino groups including trimethylammonium groups (e.g. polyAPTAC). In another embodiment, the ion exchange material can be an organic or polymeric material having attached weakly acidic groups, including carboxylic acid groups. Alternatively, the ion exchange material can be an organic or polymeric material having attached weakly basic groups, typically featuring primary, secondary, and/or tertiary amino groups (e.g. polyethylene amine).

The ion exchange material can be provided to interact with electrode material as a fully or partially embedding polymer, a particle mixture, a membrane or film, particulates or beads, or a coating. The anode alone, the cathode alone, or both the anode or cathode can be configured to interact with an ion exchange material, which can be the same or different material for the respective electrodes.

Electrolyte

An electrolyte is used to maintain high ionic conductivity between electrodes. Electrolytes can be aqueous based, solvent based, solid polymer, or an ionic liquid. In some embodiments, electrolytes can be semi-solid or gelatinized. Gelatinizing agents can include polymers that absorb the liquid of the electrolyte solution and swell. Such polymers can include polyethylene oxide, polyvinyl alcohol, polyacrylates or polyacrylic acid and polyacrylamide.

In another embodiment the electrolyte can be a solid state electrolyte. In another embodiment electrolyte can be formed as a solid material with absorbed water. For example, KOH exposed to humid air.

In another embodiment electrolytes can be formed from ion exchange material such as explained above under "Ion exchange material" section.

In one embodiment aqueous alkaline electrolytes can be used. Alkaline electrolytes can include alkalis such as potassium hydroxide, sodium hydroxide, lithium hydroxide, calcium hydroxide or inorganic salts such as zinc bromide.

Separator

A separator may be replaced with (or used in conjunction with) an ion exchange membrane or film. A conventional porous polymer separator or ion exchange separator may be provided as a polymer membrane or film. Typically, a separator is disposed between the anode and the cathode, and acts to prevent the anode and the cathode from having internal electrical shorts. In addition, the separator can also act to retain the electrolyte, particularly for battery systems that use different cathode and anode electrolyte solutions. The separator is generally required to have a porous structure or a structure having a number of perforations capable of allowing ions to pass while being chemically stable with respect to the electrolyte solution. In some embodiments, one or more separators can be formed by coating electrodes or particles that collectively form an electrode. The separator can be formed from a nonwoven fabric or a membrane having a micropore structure made of glass, polypropylene, polyethylene, resin, or polyamide. Alternatively, the separator may be constituted by a metal oxide film or a resin film combined with a metal oxide respectively having a plurality of perforations.

Processing

In one embodiment, a dry mixing process can be performed in which various anode and cathode materials, as well as additives and binders are mixed while dry. Optional processing steps such as heating, fusing, compressing, and melting ion exchange material can be performed before placing the mixture in a battery casing. In other embodiments, optional processing steps such as heating, fusing, compressing, and melting ion exchange material can be performed after placing the mixture in a battery casing. A liquid electrolyte can be added before sealing the battery casing.

According to other embodiments, a wet mixing process may instead be utilized. In a wet mixing process, one or more solvents are added at the beginning or during the mixing process, or, alternatively, one or more ingredients may be used in the form of a dispersion or suspension. The solvent(s) can be subsequently removed after the mixing process or later state in the production process.

In other embodiments, the various individual components may be made using different methods. For example, some of the electrode may be produced using a dry mixing process, while portions of the electrode may be produced using a wet process. According to yet another embodiment, it is possible to combine both dry and wet processes for the different components.

In some embodiments, a battery assembled in discharged state undergoes first charge or a sequence of several charges and discharges to establish formation of certain electrodes morphologies and/or chemical compositions and/or crystalline structures of electrode components that are beneficial for battery performance.

Battery and Cell Design

The battery cells of this invention can have any of a number of different shapes and sizes. For example, coin, prismatic, pouch or cylindrical cells can be used. Cylindrical cells of this invention may have the diameter and length of conventional AAA cells, AA cells, A cells, C, or D cells or 18650 or 26650 or 21700 cells. Custom cell designs can be used in some applications. For example, prismatic cell designs can be used for portable or vehicular applications, as well as various larger format cells employed for various non-portable applications. A battery pack can be specifically designed for particular tools or applications. Battery packs can include one or more battery cells and appropriate casing, contacts, and conductive lines to permit reliable charge and discharge in an electric device.

In the foregoing description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The foregoing detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention may be practiced in the absence of an element/step not specifically disclosed herein.

The invention claimed is:

1. A battery cell assembled in a discharged state, the battery cell comprising a cathode comprising graphite and at least one of MnO or $Mn(OH)_2$, attached to a surface of the graphite;

an anode comprising at least one of ZnO or $Zn(OH)_2$;

an ion exchange material, selective to anion transport between the cathode and the anode and comprising a polymer material and basic groups attached to the polymer material; and an aqueous electrolyte comprising one or more of potassium hydroxide, sodium hydroxide, lithium hydroxide, and calcium hydroxide.

2. The battery cell according to claim 1, wherein the battery cell, in the discharged state and before first charge or discharge, has a state of charge of less than 30% of total capacity of the battery cell.

3. The battery cell according to claim 1, wherein the cathode comprises one or more additives selected from the group consisting of Bi, Cu, Zn, Sr, Ba, Ca, Fe, Y, Cr, Co, Ni, V, Ti, Mn, Mg, Al, In, Sn, and W.

4. The battery cell according to claim 1, wherein the cathode comprises one or more conductive additives selected from the group consisting of carbon black, acetylene black, carbon fibers, carbon nanotubes, graphene, and carbon nanomaterials.

5. The battery cell according to claim 1, wherein the anode is substantially free from zinc metal.

6. The battery cell according to claim 1, wherein a concentration of ZnO in the anode is more than 90% by weight.

7. The battery cell according to claim 1, wherein the anode further comprises bismuth.

8. The battery cell according to claim 1, wherein the cathode further comprises bismuth.

9. The battery cell according to claim 1, wherein each of the anode and the cathode further comprises bismuth.

10. The battery cell according to claim 1, wherein the basic groups of the ion exchange material comprise quaternary amino groups.

11. The battery cell according to claim 1, wherein the basic groups of the ion exchange material comprise trimethylammonium groups.

12. The battery cell according to claim 1, further comprising a current collector, interfacing one of the anode or the cathode, wherein the current collector is in a plate form, foil form, mesh form, porous sponge-like form, punched form, or a slotted form.

13. The battery cell according to claim 1, wherein the ZnO or the $Zn(OH)_2$ of the anode is in a form of particles.

* * * * *